(12) United States Patent
Malladi et al.

(10) Patent No.: US 8,879,437 B2
(45) Date of Patent: Nov. 4, 2014

(54) BACKWARD COMPATIBLE LTE SYSTEM DESIGN FOR ASYMMETRIC UPLINK/DOWNLINK SPECTRUM

(75) Inventors: Durga Prasad Malladi, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/208,213

(22) Filed: Aug. 11, 2011

(65) Prior Publication Data

US 2012/0207067 A1     Aug. 16, 2012

Related U.S. Application Data

(60) Provisional application No. 61/377,879, filed on Aug. 27, 2010, provisional application No. 61/373,749, filed on Aug. 13, 2010.

(51) Int. Cl.
| | |
|---|---|
| *H04B 1/50* | (2006.01) |
| *H04W 28/04* | (2009.01) |
| *H04W 72/04* | (2009.01) |
| *H04W 24/00* | (2009.01) |
| *H04L 1/18* | (2006.01) |
| *H04L 5/00* | (2006.01) |

(52) U.S. Cl.
CPC ............... *H04B 1/50* (2013.01); *H04W 28/04* (2013.01); *H04W 24/00* (2013.01); *H04L 1/1861* (2013.01); *H04L 1/1893* (2013.01); *H04L 5/0055* (2013.01)
USPC .................. 370/281; 370/329; 455/452.1

(58) Field of Classification Search
CPC ........ H04B 1/50; H04W 28/04; H04W 72/04; H04W 24/00; H04L 1/1861; H04L 1/1893; H04L 5/0055
USPC ............. 370/281, 315–335; 455/422.1, 452.1
See application file for complete search history.

(56) References Cited

U.S. PATENT DOCUMENTS

| | | | |
|---|---|---|---|
| 2009/0201869 A1 | 8/2009 | Xu et al. | |
| 2009/0274073 A1 | 11/2009 | Sutton | |
| 2010/0118817 A1 | 5/2010 | Damnjanovic et al. | |
| 2010/0142467 A1* | 6/2010 | Tiirola et al. | 370/329 |
| 2011/0064042 A1* | 3/2011 | Kim et al. | 370/329 |
| 2011/0098054 A1* | 4/2011 | Gorokhov et al. | 455/452.1 |
| 2011/0116455 A1* | 5/2011 | Damnjanovic et al. | 370/329 |
| 2011/0134874 A1 | 6/2011 | Nakao et al. | |
| 2011/0223926 A1 | 9/2011 | Nakao et al. | |
| 2011/0299490 A1* | 12/2011 | Nordstrom et al. | 370/329 |

FOREIGN PATENT DOCUMENTS

| | | |
|---|---|---|
| JP | 2011529664 A | 12/2011 |
| WO | 2010013963 A2 | 2/2010 |
| WO | 2010016274 A1 | 2/2010 |

(Continued)

OTHER PUBLICATIONS

International Search Report and Written Opinion—PCT/US2011/047529—ISA/EPO—Nov. 11, 2011.

*Primary Examiner* — Jung Park
*Assistant Examiner* — Chuong M Nguyen
(74) *Attorney, Agent, or Firm* — Seyfarth Shaw LLP

(57) ABSTRACT

A method of frequency division duplex (FDD) wireless communications asymmetrically maps between downlink and uplink spectrum blocks. Multiple downlink spectrum blocks may be mapped to an uplink spectrum block.

34 Claims, 14 Drawing Sheets

(56) References Cited

FOREIGN PATENT DOCUMENTS

| WO | WO 2010013970 A2 * | 2/2010 | ............ H04W 72/04 |
| WO | WO2010013970 A2 | 2/2010 | |
| WO | 2010056763 A2 | 5/2010 | |
| WO | 2010064398 A1 | 6/2010 | |

* cited by examiner

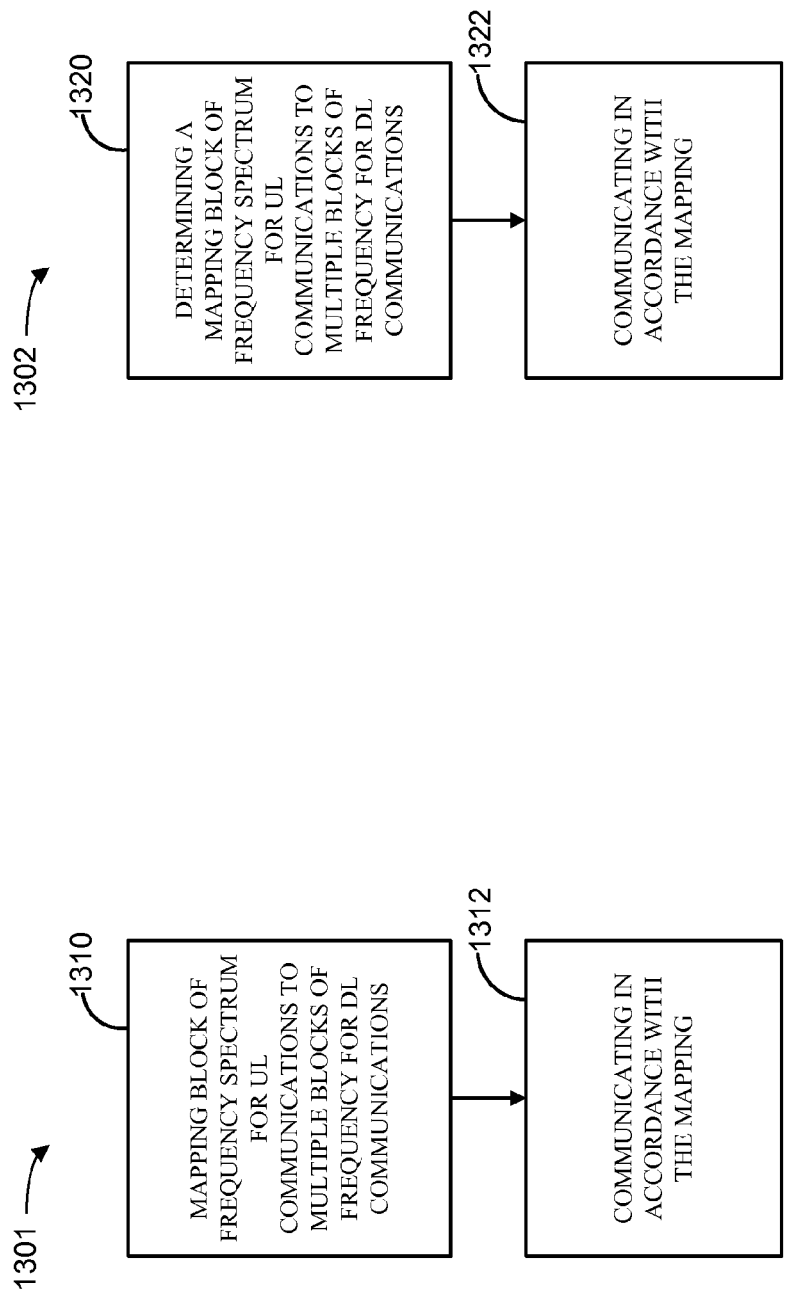

BACKWARD COMPATIBLE LTE SYSTEM DESIGN FOR ASYMMETRIC UPLINK/DOWNLINK SPECTRUM

CROSS-REFERENCE TO RELATED APPLICATIONS

This application claims the benefit under 35 U.S.C. §119(e) to U.S. Provisional Patent Application No. 61/373,749 entitled "Backward Compatible LTE System Design for Asymmetric Uplink/Downlink Spectrum," filed on Aug. 13, 2010, and U.S. Provisional Patent Application No. 61/377,879 entitled "Backward Compatible LTE System Design for Asymmetric Uplink/Downlink Spectrum," filed on Aug. 27, 2010, the disclosures of which are expressly incorporated by reference herein in their entireties.

BACKGROUND

1. Field

Aspects of the present disclosure relate generally to wireless communication systems, and more particularly to asymmetric mapping between downlink and uplink spectrum blocks in an LTE system.

2. Background

Wireless communication networks are widely deployed to provide various communication services such as voice, video, packet data, messaging, broadcast, etc. These wireless networks may be multiple-access networks capable of supporting multiple users by sharing the available network resources. A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the same or neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS and LTE technologies not only to meet the growing demand for mobile broadband access, but to advance and enhance the user experience with mobile communications.

SUMMARY

In one aspect, a method of frequency division duplex (FDD) wireless communication is disclosed. The method includes mapping a block of frequency spectrum for uplink communications to multiple blocks of frequency spectrum for downlink communications.

Another aspect discloses a method of frequency division duplex (FDD) wireless communication that includes determining a mapping of a block of frequency spectrum for uplink communications to multiple blocks of frequency spectrum for downlink communications.

In another aspect, a wireless communication having a memory and at least one processor coupled to the memory is disclosed. The processor(s) is configured to map a block of frequency spectrum for uplink communications to multiple blocks of frequency spectrum for downlink communications.

Another aspect discloses wireless communication having a memory and at least one processor coupled to the memory. The processor(s) is configured to determine a mapping of a block of frequency spectrum for uplink communications to multiple blocks of frequency spectrum for downlink communications.

In another aspect, an apparatus is disclosed that includes means for mapping a block of frequency spectrum for uplink communications to multiple blocks of frequency spectrum for downlink communications. Also included is means for communicating in accordance with the mapping.

Another aspect discloses an apparatus for wireless communication and includes means for determining a mapping of a block of frequency spectrum for uplink communications to multiple blocks of frequency spectrum for downlink communications. Also included is means for communicating in accordance with the mapping.

In another aspect, a computer program product for wireless communications in a wireless network is disclosed. The computer readable medium has program code recorded thereon which, when executed by the processor(s), causes the processor(s) to perform operations of mapping a block of frequency spectrum for uplink communications to multiple blocks of frequency spectrum for downlink communications.

Another aspect discloses a computer program product for wireless communications in a wireless network. The computer readable medium has program code recorded thereon which, when executed by the processor(s), causes the processor(s) to perform operations of determining a mapping of a block of frequency spectrum for uplink communications to multiple blocks of frequency spectrum for downlink communications.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 13A-B are block diagrams illustrating an exemplary method for mapping.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
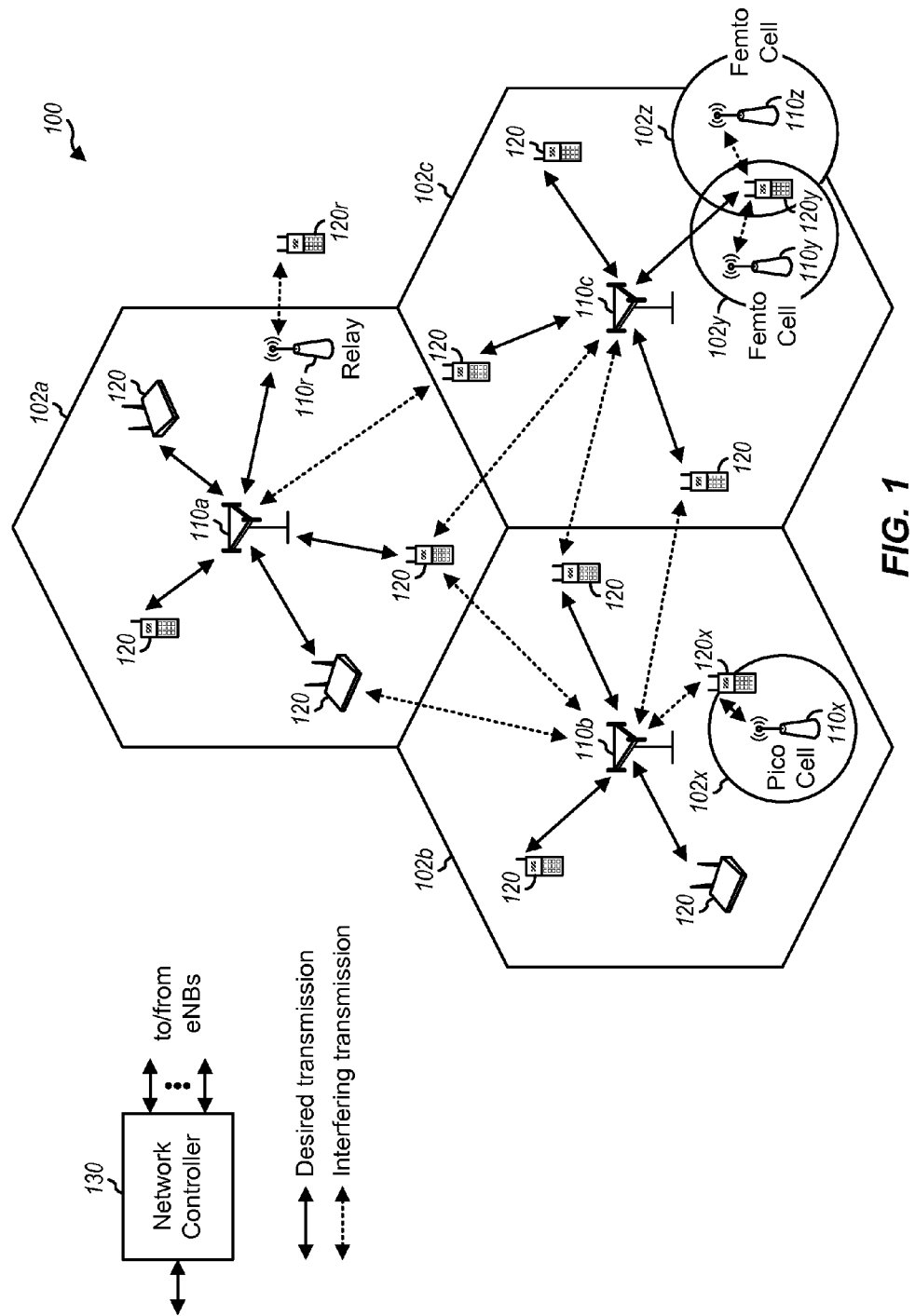
FIG. 1 is a block diagram conceptually illustrating an example of a telecommunications system.

FIG. 1 shows a wireless communication network 100, which may be an LTE-A network, in which asymmetric mapping between downlink and uplink spectrum blocks may be implemented. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 supports frequency division duplex (FDD) modes of operation and the techniques described herein may be used for FDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

Figure 2:
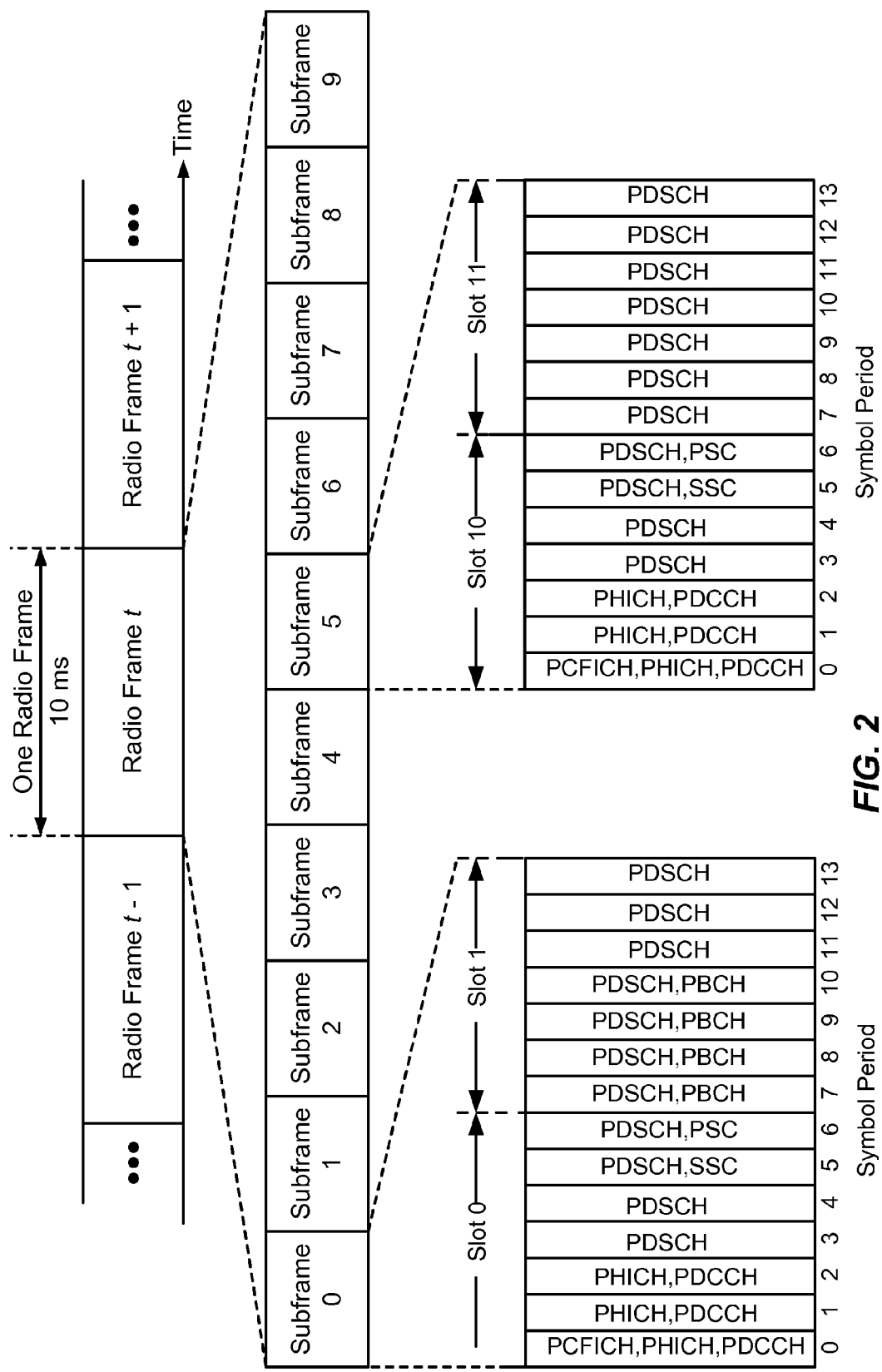
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as illustrated in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
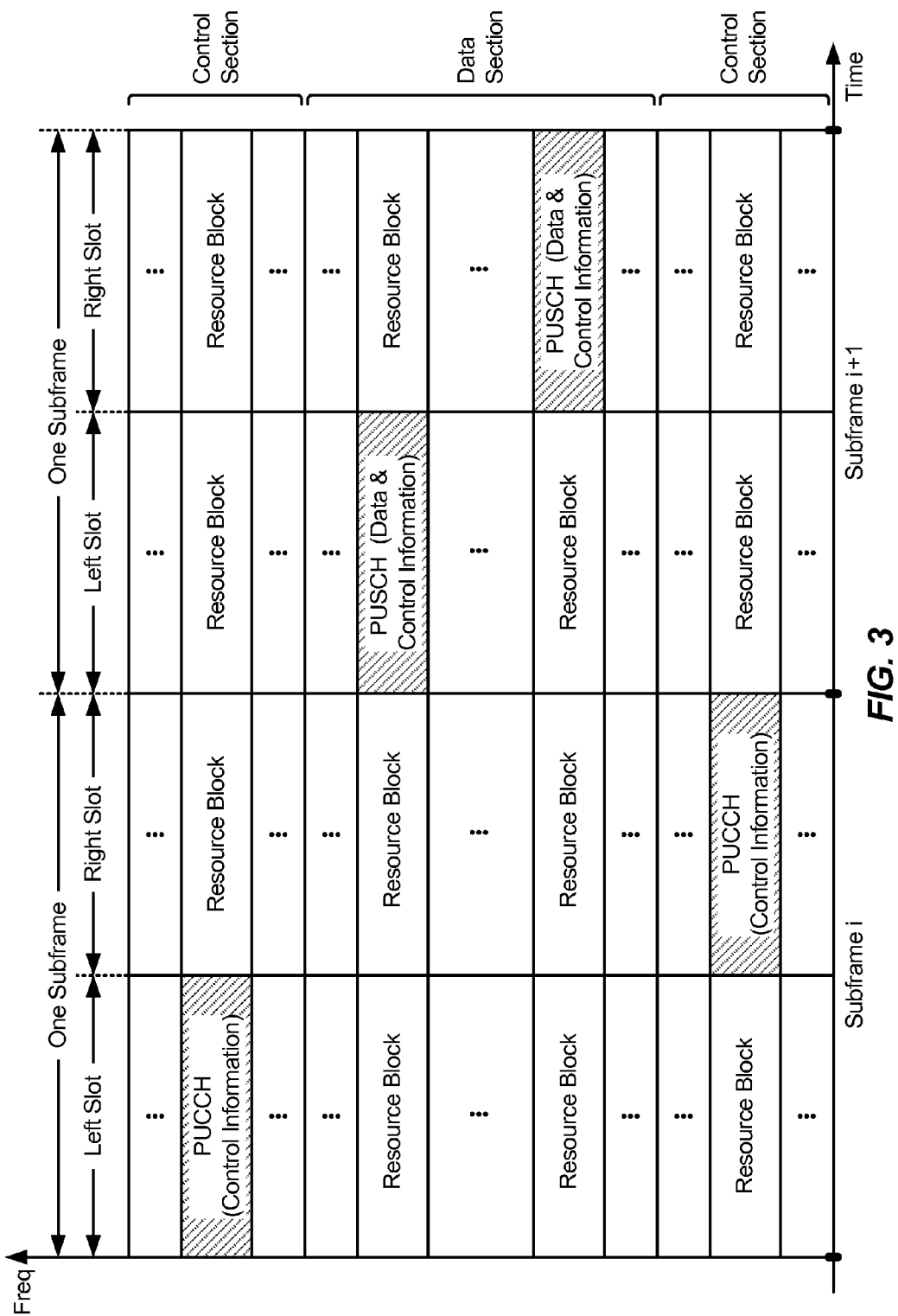
FIG. 3 is a block diagram conceptually illustrating an example frame structure in uplink communications.

FIG. 3 is a block diagram conceptually illustrating an exemplary FDD subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC (primary synchronization carrier), SSC (secondary synchronization carrier), CRS (common reference signal), PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
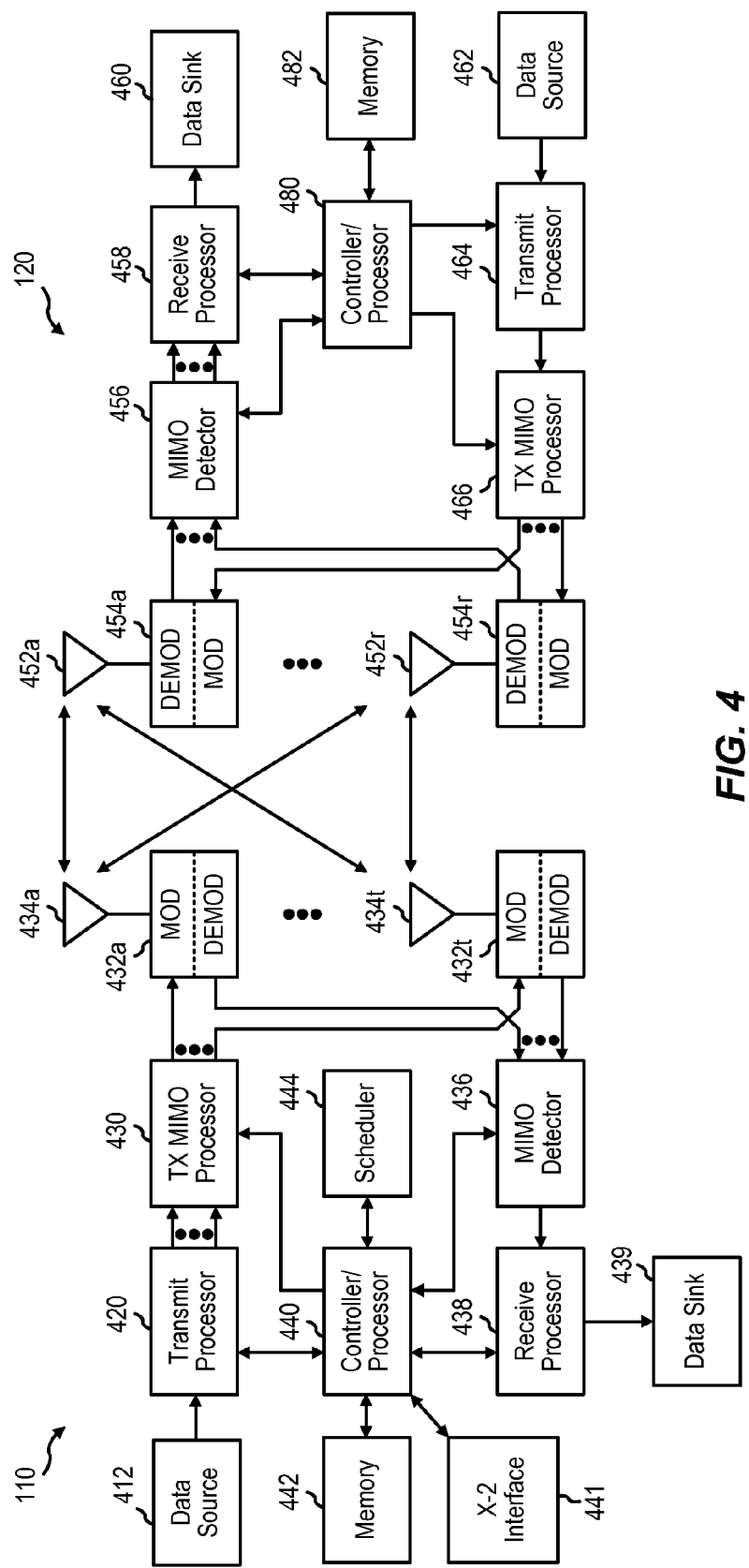
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in use FIGS. 13 and 14, and/or other processes for the techniques described herein. The memories 442 and 482 may store data and program codes for the base station 110 and the UE 120, respectively. A scheduler 444 may schedule UEs for data transmission on the downlink and/or uplink.

In FDD LTE deployment, the downlink and uplink carrier frequencies are separated by a certain amount of space to avoid interference between the downlink and uplink. In some scenarios, the available downlink and uplink bandwidth may be different. Additionally, the available downlink or uplink spectrum may not be continuous, but may instead constitute disjointed spectrum blocks. In particular, the downlink and uplink spectrum blocks may be interlaced with each other and/or the downlink (uplink) spectrum blocks may not have the corresponding matching uplink (downlink) spectrum blocks.

Figure 5:
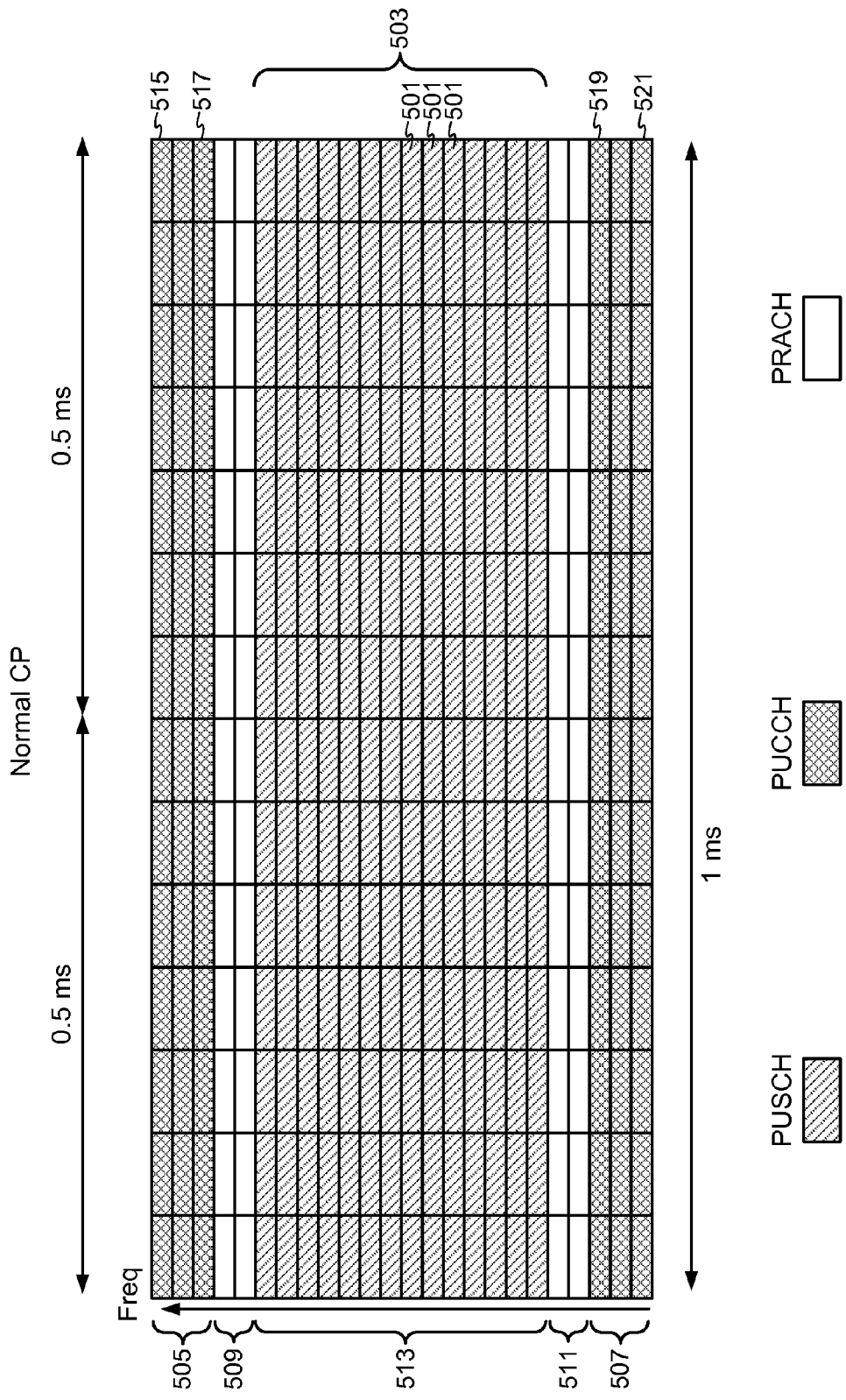
FIG. 5 is a block diagram conceptually illustrating a more detailed example frame structure in uplink communications.

FIG. 5 illustrates a more detailed example of a frame structure in LTE uplink communications. In LTE, physical resources (time and frequency) are quantized to resource elements (RE) 501, where each resource element corresponds to a certain frequency domain span (one subcarrier) and a certain time domain span (one OFDM symbol). For example, a resource element for LTE with normal cyclic prefix (CP) corresponds to a 15 KHz span in frequency domain and about 70 us in time domain.

Furthermore, 12 consecutive REs 501 in frequency domain of a slot (0.5 ms in duration) are called a physical resource block (PRB) 503. For example, a physical resource block for normal cyclic prefix corresponds to a 180 KHz span in the frequency domain and 0.5 ms in the time domain. LTE data channels (e.g., physical downlink shared channel (PDSCH) for downlink and physical uplink shared channel (PUSCH) for uplink) are transmitted over one or more physical resource blocks 503. Control regions 505, 507, physical random access channel (PRACH) regions 509, 511, and a data region 513 are also provided.

Hybrid automatic repeat request (HARM) is used in LTE for PDSCH and PUSCH operation. When a packet is received correctly, a positive acknowledgement (ACK) is sent to the transmitter. When a packet cannot be received correctly, a negative acknowledgement (NAK) is sent to the transmitter to request a retransmission of the same packet. Such a process continues until the packet is received correctly or the number of retransmissions reaches a pre-defined limit.

LTE is a fully scheduled system. A data channel transmission is the result of some scheduling decision made by the eNodeB. Such a scheduling decision of downlink or uplink data transmission is conveyed to a UE via a control message. For the downlink PDSCH transmission, the eNodeB transmits a downlink control message on the physical downlink control channel (PDCCH) to indicate the presence and associated format of a PDSCH (re)transmission and the identification (ID) of the intended UE. The data and control transmission are in the same subframe. Upon processing the PDSCH transmission, the UE sends an ACK/NAK on the PUCCH on the uplink as part of the HARQ operation or is multiplexed with the PUSCH if a PUSCH (re)transmission is scheduled.

For the uplink PUSCH transmission, the eNodeB transmits an uplink grant message on the PDCCH to a target UE to indicate that the UE is allowed to transmit on the PUSCH 4 ms later on certain physical resource blocks (PRBs) and with a certain packet size. Upon reception, the UE transmits data in the designated physical resource blocks and subframe. Once the eNodeB receives the PUSCH transmission, the eNodeB sends a control message to the UE as part of the HARQ process. The control message can be an ACK/NAK bit on a physical hybrid automatic repeat request indicator channel (PHICH) of the downlink or a new grant message on PDCCH. The control message can also be an uplink grant message for PUSCH retransmission (PUSCH packet reception failed) or new transmission (PUSCH packet reception was successful).

The LTE system supports multiple data channels multiplexing on the downlink and uplink spectrum. There can be multiple PDSCH transmissions on the downlink in a same subframe. Similarly, there can be multiple PUSCH transmission on the uplink. To feedback ACK/NAK for data channel transmissions, LTE supports multiple control channels (physical downlink control channel (PDCCH), physical hybrid automatic repeat request indicator channel (PHICH), and physical uplink control channel (PUCCH)). Moreover, there is a one-to-one correspondence between data channels and the corresponding HARQ feedback channels. To avoid signaling overhead, such a correspondence is defined using implicit rules. For example, the PUCCH channel indices (for ACK/NAK of PDSCH transmission) are determined based the index of the first resource blocks of the PDSCH transmission. The PHICH channel indices (for ACK/NAK of PUSCH transmission) are determined based the index of the first resource blocks of the PUSCH transmission.

The eNodeB allocates certain uplink resource blocks (RBs) in certain subframes for random access. The allocation is signaled to the UEs via a broadcast channel. The eNodeB allocates certain uplink resource blocks (RBs) in certain subframes for UEs to transmit sounding reference signals (SRS). The allocation is signaled to UEs via a broadcast channel.

In one aspect of the present disclosure, an LTE network includes asymmetric mapping between downlink and uplink spectrum blocks, where a spectrum block is defined as a contiguous frequency spectrum. If there are more downlink spectrum blocks, then multiple downlink spectrum blocks can map to a single uplink spectrum block. In one aspect, mapping is the pairing of a downlink spectrum block and an uplink spectrum block for FDD transmission. For example, in FIG. 6, there are more downlink spectrum blocks (e.g., downlink spectrum blocks 611, 612, 613, 614 and 615) than uplink spectrum blocks (601, 602 and 603). In the example illustrated in FIG. 6, the uplink spectrum 601 is mapped to both the downlink spectrum 611 and the downlink spectrum 612. Similarly, the uplink spectrum 603 is mapped to both the downlink spectrum 614 and the downlink spectrum 615. The uplink spectrum 602 is mapped to the downlink spectrum 613 in a conventional manner.

Because there are multiple downlink spectrum blocks mapping to a single uplink spectrum block, uplink physical resource blocks (PRBs) are split or reused among the PUSCH/PUCCH/PRACH/SRS of the multiple downlink spectrum blocks. An example of mapping two downlink spectrum blocks to a single uplink spectrum block is illustrated in FIG. 7. An exemplary allocation of an uplink spectrum block (e.g., uplink spectrum 601 from FIG. 6) is shown, where the PUCCH, PUSCH, and PRACH of one downlink spectrum block (e.g., downlink spectrum 611) use separate spectrum blocks of uplink physical resource blocks (PRBs) from those of the other downlink spectrum block (e.g., downlink spectrum 612).

Figure 6:
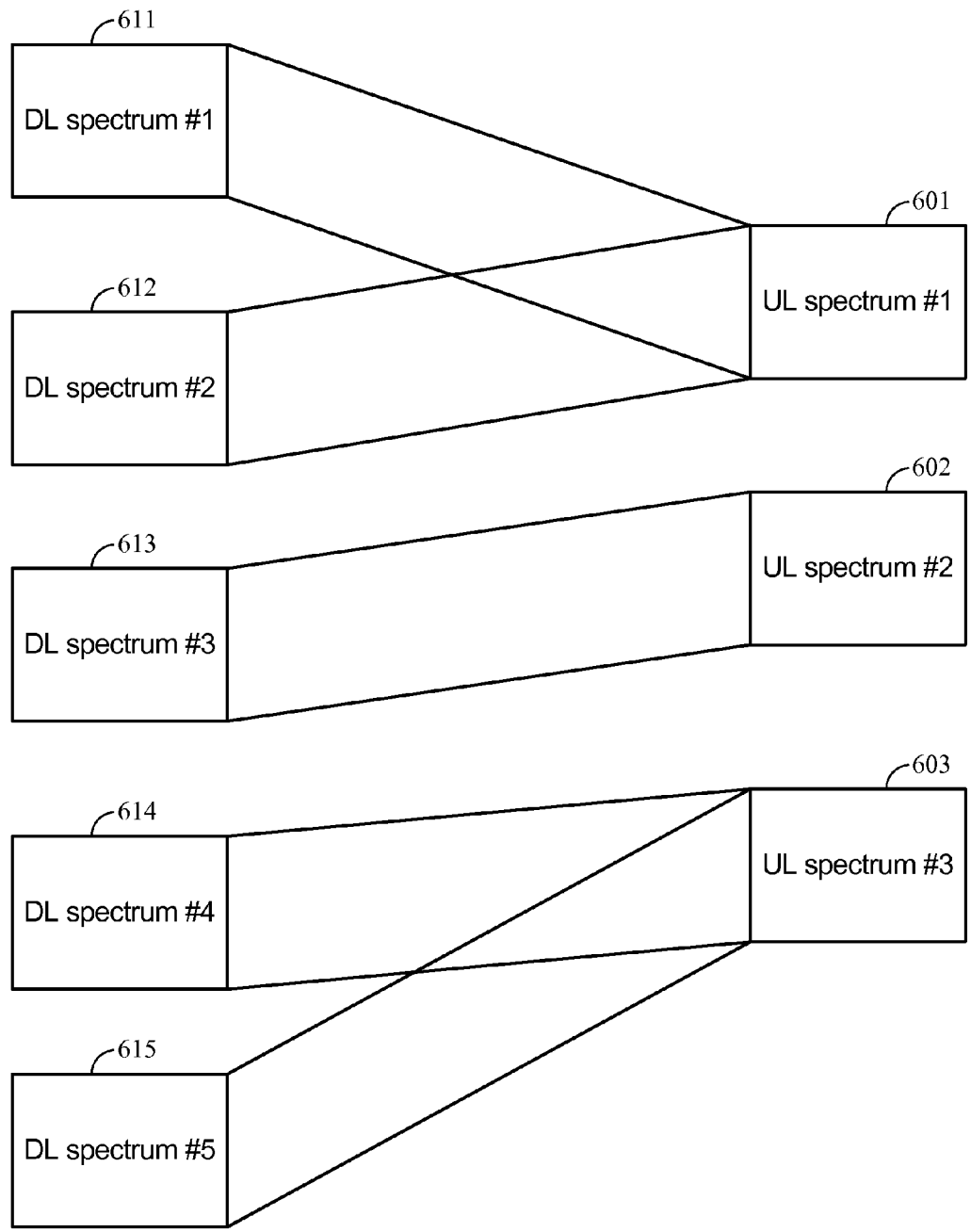
FIG. 6 is a block diagram illustrating asymmetric mapping between downlink spectrum blocks and uplink spectrum blocks.
Figure 7:
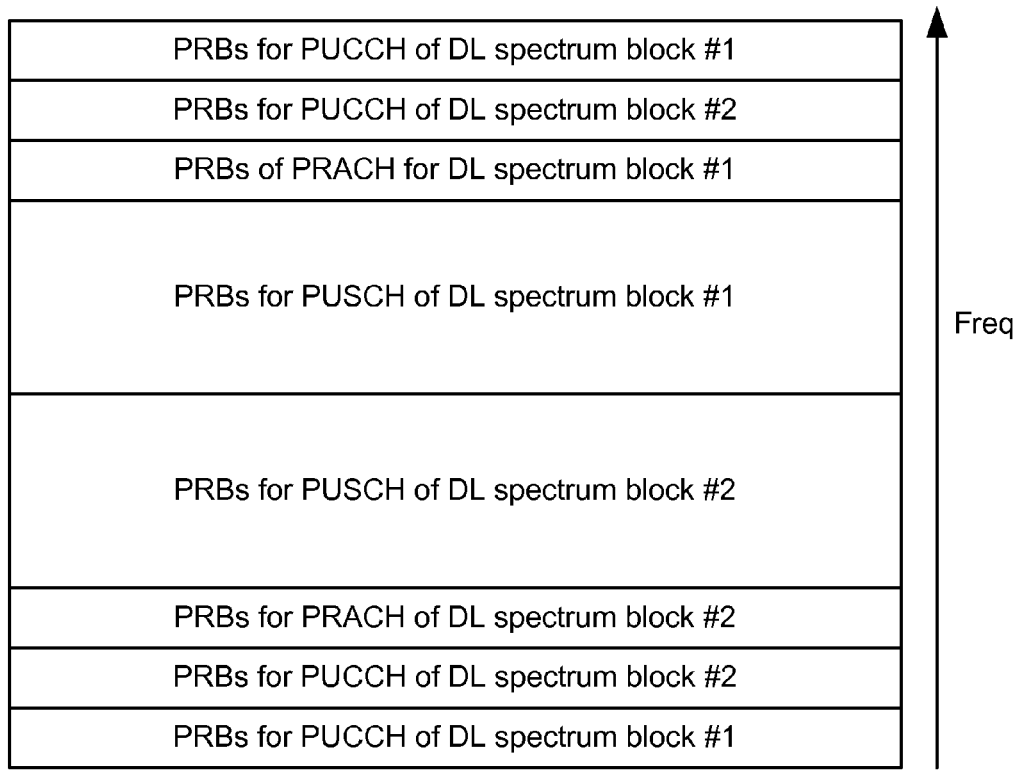
FIG. 7 is a block diagram illustrating an example of two downlink spectrum blocks mapped to a single uplink spectrum block.

Rather than mapping all physical resource blocks (PRBs) for the PUCCH from both the top and bottom control sections 505, 507 (See FIG. 5, sections 505 and 507) to a single downlink spectrum block as seen in FIG. 5, the physical resource blocks from the uppermost portion 515 of the top section 505 and the lowermost portion 521 of the bottom section 507 are mapped to the PUCCH of one downlink spectrum block (e.g., downlink spectrum 611 of FIG. 6). The physical resource blocks from the lowermost portion 517 of the top section 505 and the uppermost portion 519 of the bottom section 507 are mapped to the PUCCH of the other downlink spectrum block (e.g., downlink spectrum 612 of FIG. 6). The upper section 509 of the PRACH physical resource blocks are mapped to the first downlink spectrum block (e.g., downlink spectrum 612), whereas the lower section 511 of the PRACH physical resource blocks are mapped to the other downlink spectrum block (e.g., downlink spectrum 612). The PUSCH physical resource blocks are split between two downlink spectrum blocks. In one aspect, the physical resource block allocation for the PUCCH and PRACH are signaled to UEs on the downlink. In another aspect, the physical resource block allocation for the PUSCH is configured by adding some constraints to the scheduler at the eNodeBs. In particular, the scheduler at the eNodeBs for the downlink spectrum 611 and 612 will each ensure all its PUSCH assignments only occupy the PUSCH physical resource blocks assigned to each downlink spectrum blocks, respectively.

The resources for the sounding reference signal (SRS) associated with the two downlink spectrum blocks can be orthogonalized via their SRS configurations. In one aspect, one subframe may be used to transmit the SRS corresponding to one downlink spectrum block and the next subframe may be used to transmit the SRS corresponding to another downlink spectrum block. In another aspect, the SRS for the two downlink spectrum blocks can also be orthgonized in frequency domain, where the eNodeBs can configure the SRS resources so that they do not collide across frequency spectrums.

Figure 8A:
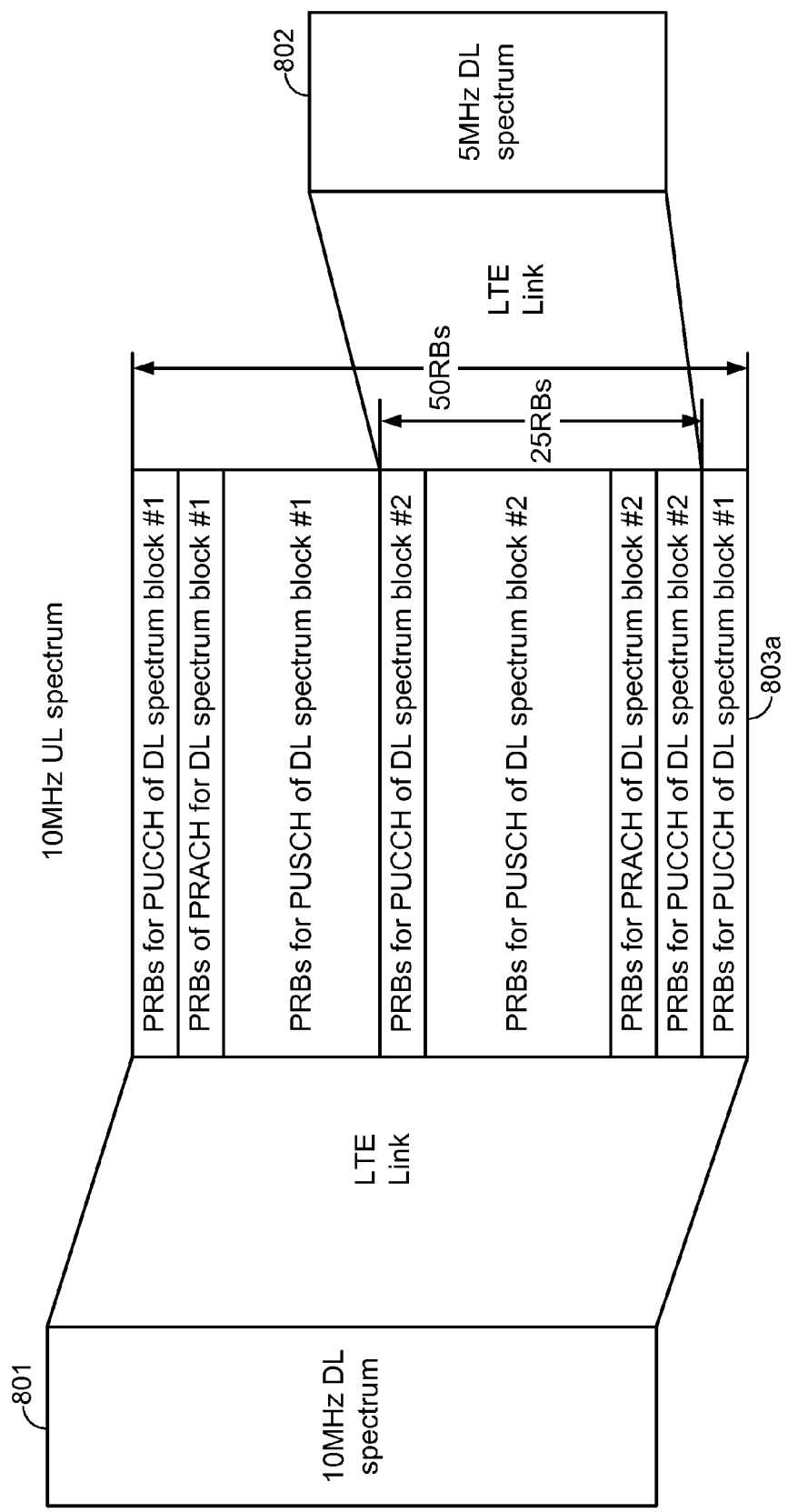
FIGS. 8A-8C are block diagrams illustrating various examples of mapping two downlink spectrum blocks to an uplink spectrum block when one of the downlink spectrum blocks is mapped to a part of the uplink spectrum block.
Figure 8B:
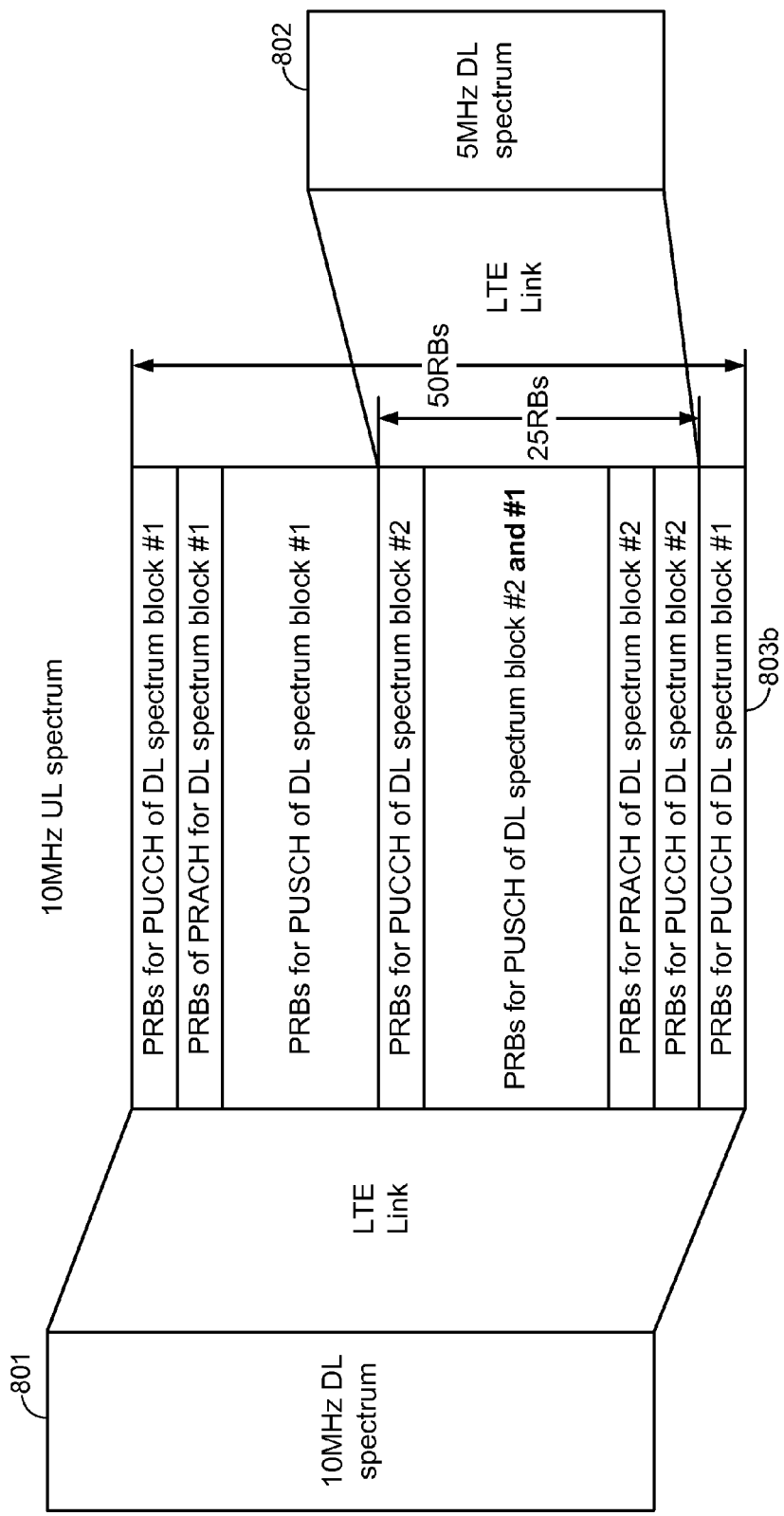
Figure 8C:
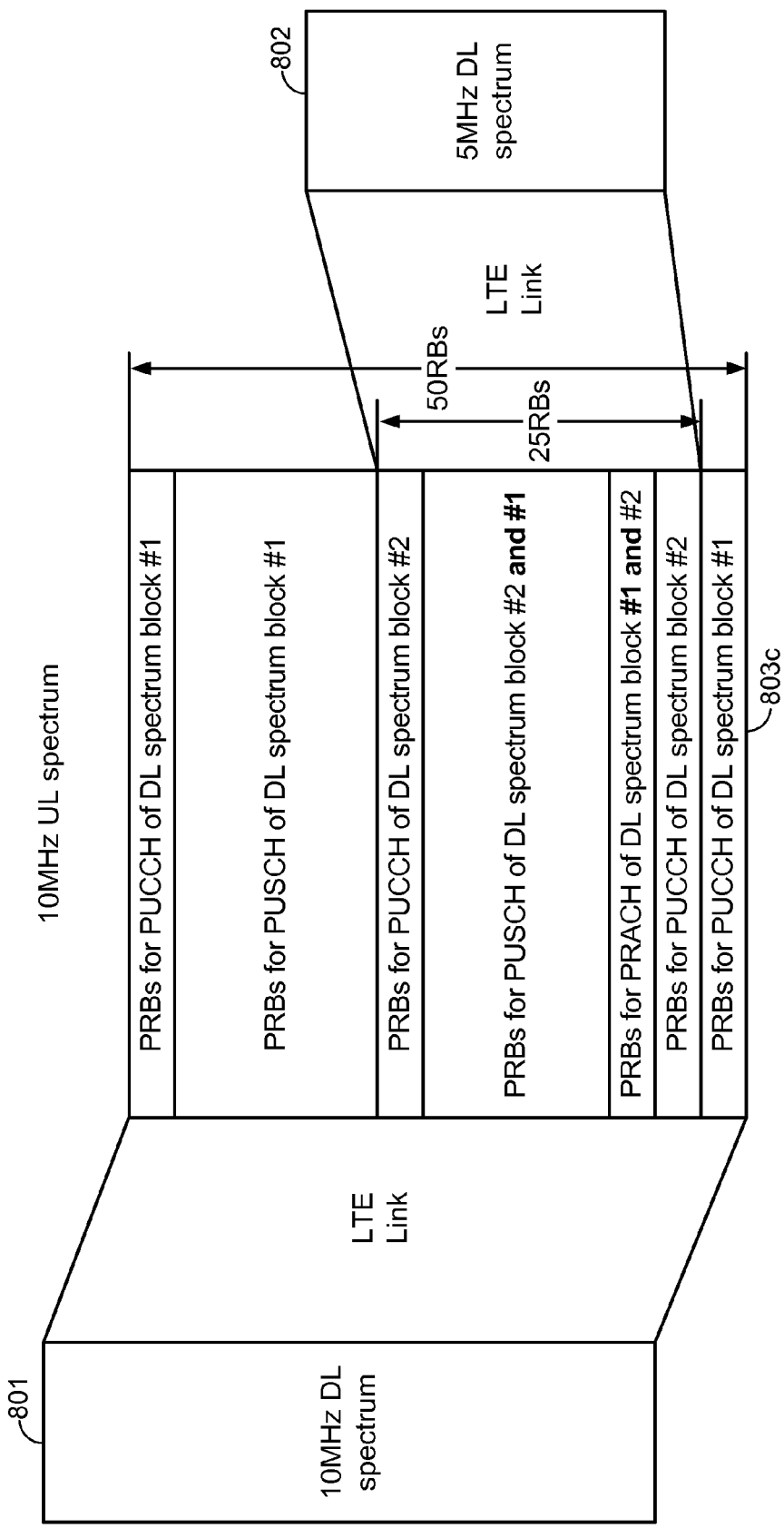

Other aspects of the present disclosure address when one of the downlink spectrum blocks is smaller than the uplink spectrum block. The resulting mapping may be different from that of FIG. 7. For example, in FIGS. 8A-8C, a first downlink spectrum 801 is 10 MHz and second downlink spectrum 802 is 5 MHz. FIGS. 8A-8C illustrate various examples of the mapping that may be implemented, where for such a mapping, there are effectively two LTE links. One LTE link is on the 10 MHz downlink spectrum 801, which corresponds to the 10 MHz uplink spectrum as for a typical LTE system with 10 MHz bandwidth for both downlink and uplink. The other LTE link is on the 5 MHz downlink spectrum 802, which is half of the 10 MHz uplink spectrum as for a typical LTE system. These aspects account for the scenario where 5 MHz of the uplink spectrum is mapping to both links.

From the UE perspective, these two links appear as two separate links, each having a different bandwidth and different carrier frequency. Each UE either stays in the 10 MHz link or the 5 MHz link. UEs can freely handover between these two eNodeBs as usual and a full backward compatibility to Release-8 may be maintained. Handover criteria between the two links can be the loading of the two links, UE traffic demand and/or QoS requirements, UE channel condition, etc. The eNodeB scheduler of the 10 MHz schedules its PUSCHs only in the allocated uplink physical resource blocks. If a UE supports multiple carriers, it can maintain both 10 MHz and 5 MHz links simultaneously.

In FIG. 8A, the downlink spectrum blocks 801 and 802 map to uplink spectrum block 803a. The PUSCH of the downlink spectrum block 801 is limited to roughly only part of the physical resource blocks in the data region of the uplink spectrum 803a. Additionally, the PUCCH of the downlink spectrum block 802 is mapped to the central region of the uplink spectrum 803a and to a portion of the lower control section in the uplink spectrum block 803a. By mapping the PUCCH of the downlink spectrum 802 to a central portion of the uplink spectrum block 803a, the expected frame structure is maintained while staying within the smaller bandwidth limitation (i.e., 5 MHz in this example). The PUCCH of the downlink spectrum block 801 maps to a top edge portion of the upper control section in the uplink spectrum block 803a as well as to a bottom edge portion of the lower control section in the uplink spectrum block 803a.

Additionally, the PRACH for the downlink spectrum block 801 maps to the upper control section of the uplink spectrum block 803a. The PRACH for the downlink spectrum block 802 maps to the lower control section of the uplink spectrum block 803a.

In other configurations, as illustrated in FIGS. 8B and 8C, the physical resource blocks of the PUSCH of the downlink spectrum 801 (i.e., the 10 MHz downlink spectrum) are overloaded with the physical resource blocks of the PUSCH for the downlink spectrum 802 (i.e., the 5 MHz downlink spectrum) as well. FIG. 8B illustrates the PUSCH of the downlink spectrum blocks 801 and 802 mapping to the same portion of the data region of the uplink spectrum block 803b. The schedulers of the two downlink spectrum blocks 801 and 802 can collaborate, for example via X2 communications, to ensure the respective PUSCHs do not collide with each other. Alternately, a single component can house both eNodeBs. In another configuration, the schedulers of the two downlink spectrum blocks 801 and 802 can operate independently. A PUSCH transmission from downlink spectrum block 801 may be treated as interference by the downlink spectrum block 802 if it occupies the same physical resource block and is processed with interference cancellation, interference suppression, etc.

In the example illustrated in FIG. 8C, the PRACH is accessed at the same frequency resources by both sets of UEs associated with the two downlink spectrum blocks. If a collision occurs, the eNodeBs can still separate the PRACH transmissions via inherent signal characteristics.

Figure 9:
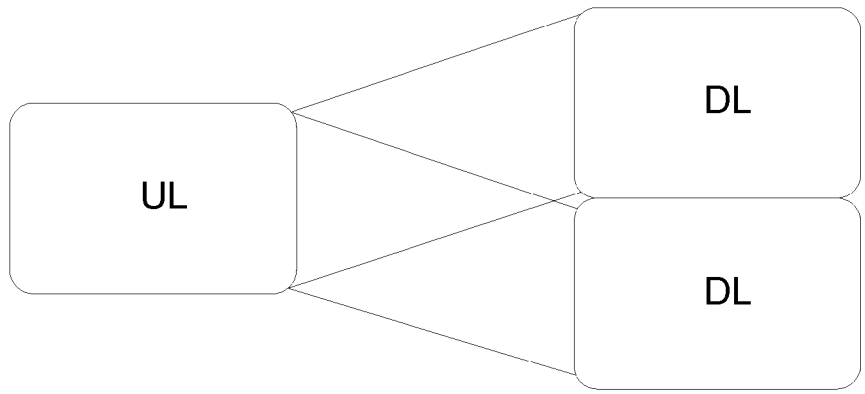
FIG. 9 is a block diagram illustrating contiguous downlink spectrum blocks mapped to an uplink spectrum block.
Figure 10:
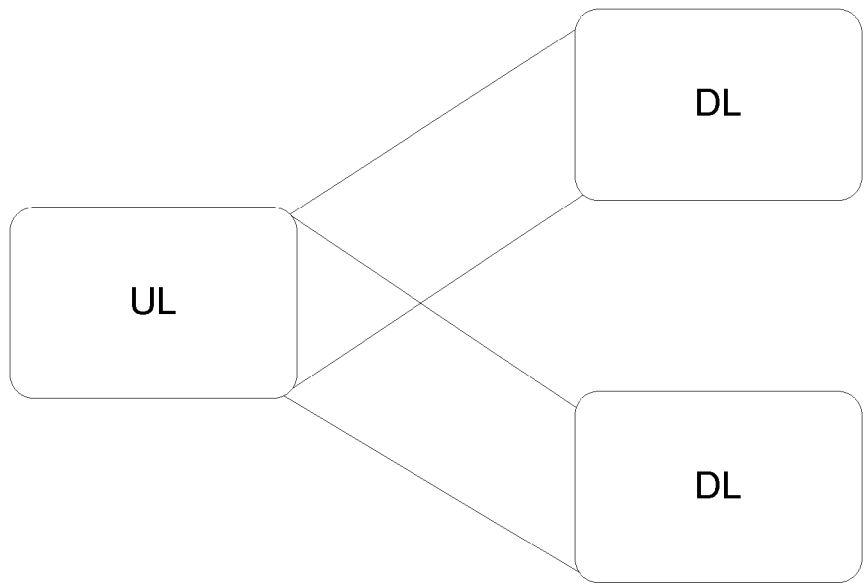
FIG. 10 is a block diagram illustrating non-contiguous downlink spectrum blocks mapped to an uplink spectrum block.

As illustrated in FIG. 9, the downlink spectrum blocks may be contiguous. The contiguous blocks may be treated as one logical link. However, if the contiguous blocks are not treated as one logical link, then the mapping procedures described above may be applied. Similarly, if the downlink spectrum blocks are not contiguous to each other, as illustrated in FIG. 10, the mapping procedures may be applied.

Figure 11:
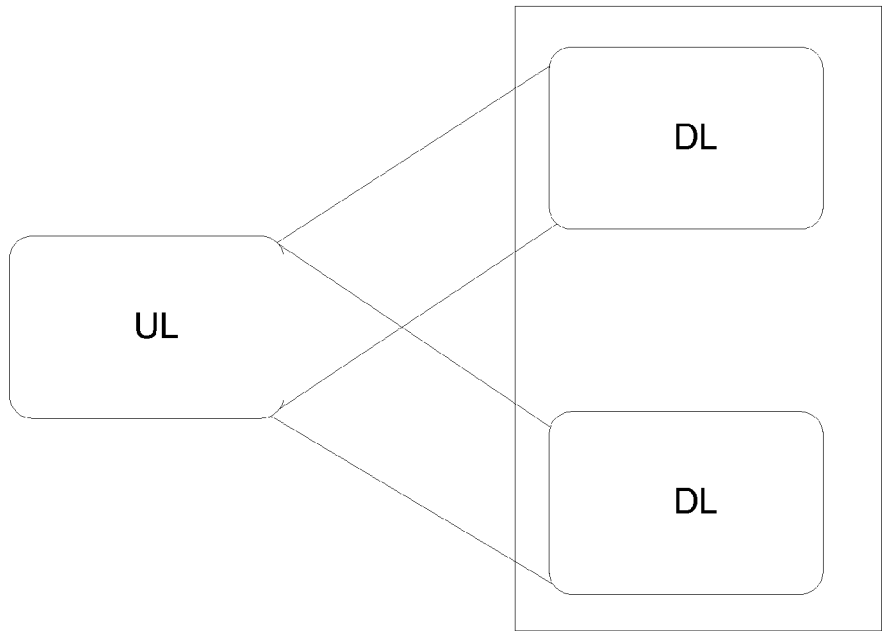
FIG. 11 is a block diagram illustrating non-contiguous downlink spectrum blocks in the same operating band.
Figure 12:
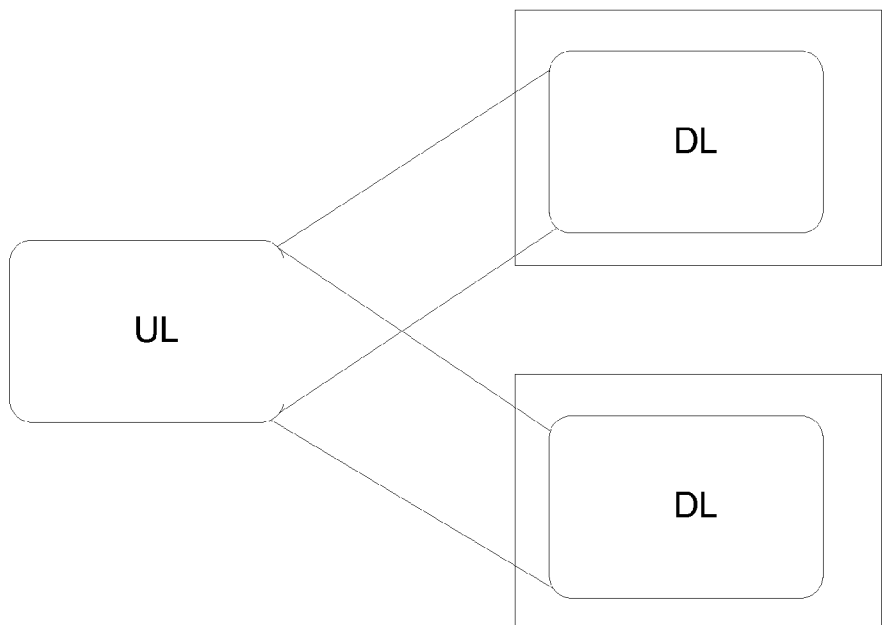
FIG. 12 is a block diagram illustrating non-contiguous downlink spectrum blocks in different operating bands mapped to an uplink spectrum block.

In another aspect, non-contiguous downlink spectrum blocks may belong to the same operating band as illustrated in FIG. 11. For example, the non-contiguous downlink spectrum blocks may operate in band 40 or in band 7. Optionally, the non-contiguous downlink spectrum blocks may operate in different bands, as illustrated in FIG. 12. For example, one downlink spectrum block may operate in band 40 and another downlink spectrum block may operate in band 7, FIG. 13A illustrates a method 1301 for communicating in a wireless network. In block 1310, an eNodeB maps a block of frequency spectrum for uplink communications to multiple blocks of frequency for downlink communications. In block 1312, the eNodeB communicates in accordance with the mapping.

FIG. 13B illustrates a method 1302 for communicating in a wireless network. In block 1320, a UE determines or receives a communication mapping a block of frequency spectrum for uplink communications to multiple blocks of frequency for downlink communications. In block 1322, the UE communicates in accordance with the mapping.

In one configuration, the eNodeB 110 is configured for wireless communication including means for mapping. In one aspect, the mapping means may be the controller processor 440 and/or memory 442 configured to perform the functions recited by the mapping means. The eNodeB 110 is also configured to include a means for communicating. In one aspect, the communicating means may be the transmit processor 420, modulators 432a-t, controller/processor 440, memory 442, scheduler 444, and/or antenna 434a-t configured to perform the functions recited by the communicating means. In another aspect, the aforementioned means may be a module or any apparatus configured to perform the functions recited by the aforementioned means.

In one configuration, the UE 120 is configured for wireless communication including means for receiving. In one aspect, the receiving means may be the receive processor 458, demodulators 454a-r, controller/processor 480, memory 482, and/or antenna 452a-t configured to perform the functions recited by the receiving means. The eNodeB 110 is also configured to include a means for communicating. In one aspect, the communicating means may be the transmit processor 464, modulators 454a-r and antenna 4524a-r, controller/processor 480, and/or memory 482 configured to perform the functions recited by the communicating means. In another aspect, the aforementioned means may be a module or any apparatus configured to perform the functions recited by the aforementioned means.

Figure 14A:
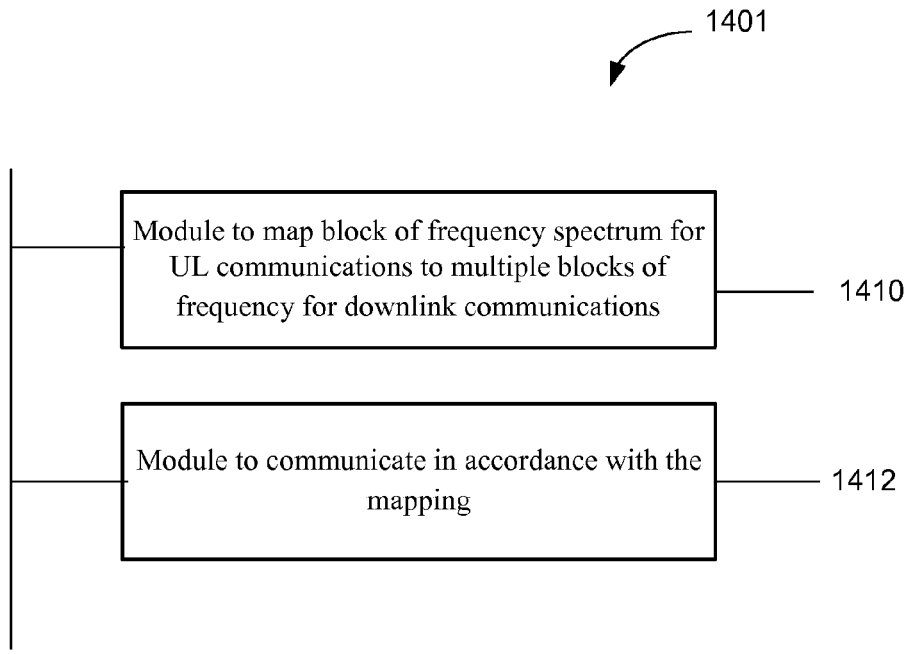
FIGS. 14A-B are block diagrams illustrating exemplary components for mapping.

FIG. 14A shows a design of an apparatus 1401 for a base station, such as the eNodeB 110 of FIG. 4. The apparatus 1401 includes a module 1410 for mapping a block of frequency spectrum for uplink communications to multiple blocks of frequency for downlink communications. Also included is a module 1412 for communicating in accordance with the mapping. The modules in FIG. 14A may be processors, electronics devices, hardware devices, electronics components, logical circuits, memories, software codes, firmware codes, etc., or any combination thereof.

Figure 14B:
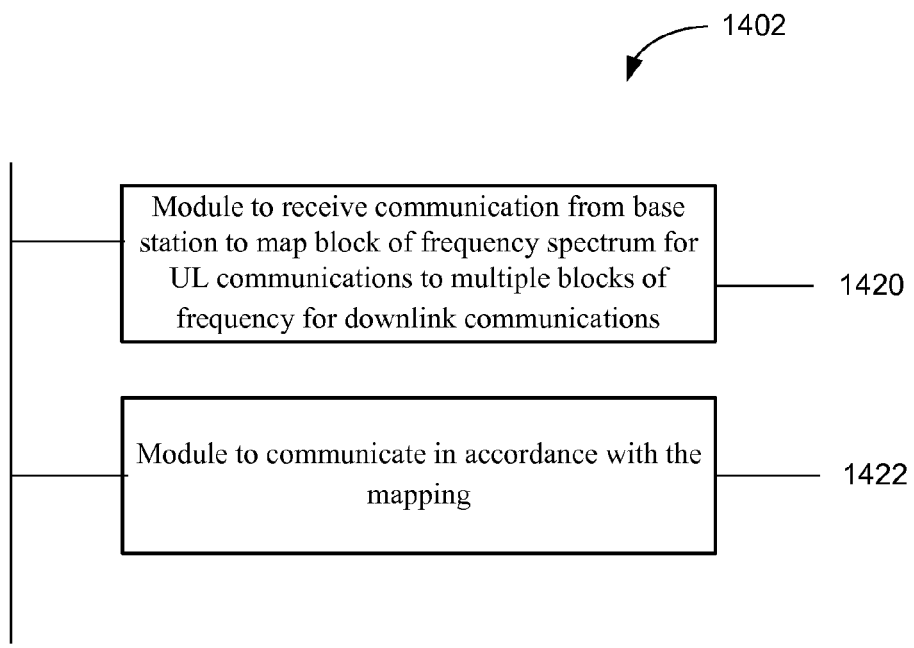

FIG. 14B shows a design of an apparatus 1402 for a UE, such as the UE 120 of FIG. 4. The apparatus 1402 includes a module 1420 for determining. The communication maps a block of frequency spectrum for uplink communications to multiple blocks of frequency for downlink communications. The apparatus 1402 also includes a module 422 for communicating in accordance with the mapping. The modules in FIG. 14B may be processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of frequency division duplex (FDD) wireless communications, comprising:
    mapping a control channel region of frequency spectrum for uplink communications to a plurality of blocks of frequency spectrum for downlink communications, by associating uplink physical resource blocks (PRBs) of the control channel region to each downlink spectrum block, the control channel region comprising a first PRB and a second PRB, the first PRB of the control channel region being mapped to a first downlink spectrum block and the second PRB of the control channel region being mapped to a second downlink spectrum block.

2. The method of claim 1, further comprising mapping by associating uplink PRBs of at least one of a physical uplink shared channel (PUSCH), a physical random access channel (PRACH), and a sound reference signal (SRS), to each downlink spectrum block.

3. The method of claim 1, in which the downlink spectrum blocks have differing sizes.

4. The method of claim 3, in which only a portion of each uplink spectrum block maps to a smaller sized downlink spectrum block.

5. The method of claim 1, in which associating of uplink physical resource blocks (PRBs) comprises a disjointed associating of uplink PRBs.

6. The method of claim 1, in which the associating of uplink physical resource blocks (PRBs) comprises overloading the associating of uplink PRBs, in which the plurality of downlink spectrum blocks share a portion of the overloaded uplink PRBs.

7. The method of claim 1, in which the plurality of blocks of frequency spectrum for downlink communications are contiguous in frequency domain.

8. The method of claim 1, in which the plurality of blocks of frequency spectrum for downlink communications are non-contiguous in frequency domain.

9. The method of claim 1, further comprising scheduling sounding reference signal transmissions that are orthogonal for the plurality of downlink spectrum blocks.

10. A method of frequency division duplex (FDD) wireless communications, comprising:
  determining a mapping of a control channel region of frequency spectrum for uplink communications to a plurality of blocks of frequency spectrum for downlink communications, by associating uplink physical resource blocks (PRBs) of the control channel region to each downlink spectrum block, the control channel region comprising a first PRB and a second PRB, the first PRB of the control channel region being mapped to a first downlink spectrum block and the second PRB of the control channel region being mapped to a second downlink spectrum block.

11. The method of claim 10, in which the determining is based on a received communication from a base station.

12. The method of claim 10, further comprising determining the mapping by associating uplink PRBs of at least one of a physical uplink shared channel (PUSCH), a physical random access channel (PRACH), and a sounding reference signal (SRS) to each downlink spectrum block.

13. The method of claim 10, in which the downlink spectrum blocks have differing sizes.

14. The method of claim 13, in which only a portion of each uplink spectrum block maps to a smaller sized downlink spectrum block.

15. The method of claim 10, further comprising sending a first sounding reference signal to a first base station and sending a second sounding reference signal orthogonal to the first sounding reference signal to a second base station.

16. An apparatus for frequency division duplex (FDD) wireless communication, comprising:
  a memory; and
  at least one processor coupled to the memory, the at least one processor being configured to map a control channel region of frequency spectrum for uplink communications to a plurality of blocks of frequency spectrum for downlink communications, by associating uplink physical resource blocks (PRBs) of the control channel region to each downlink spectrum block, the control channel region comprising a first PRB and a second PRB, the first PRB of the control channel region being mapped to a first downlink spectrum block and the second PRB of the control channel region being mapped to a second downlink spectrum block.

17. The apparatus of claim 16, in which the at least one processor is further configured to map by associating uplink PRBs of at least one of a physical uplink shared channel (PUSCH), a physical random access channel (PRACH), and a sound reference signal (SRS) to each downlink spectrum block.

18. The apparatus of claim 16, in which the downlink spectrum blocks have differing sizes.

19. The apparatus of claim 18, in which only a portion of each uplink spectrum block maps to a smaller sized downlink spectrum block.

20. The apparatus of claim 18, in which the processor is further configured to map by disjointly associating uplink PRBs.

21. The apparatus of claim 16, in which the processor is further configured to map by overloading the associating of uplink PRBs, in which the plurality of downlink spectrum blocks share a portion of the overloaded uplink PRBs.

22. The apparatus of claim 16, in which the plurality of blocks of frequency spectrum for downlink communications are contiguous in frequency domain.

23. The apparatus of claim 16, in which the plurality of blocks of frequency spectrum for downlink communications are non-contiguous in frequency domain.

24. The apparatus of claim 16, in which the processor is further configured to schedule sounding reference signal transmissions that are orthogonal for the plurality of downlink spectrum blocks.

25. An apparatus for frequency division duplex (FDD) wireless communications, comprising:
  a memory; and
  at least one processor coupled to the memory, the at least one processor being configured to determine a mapping of a control channel region of frequency spectrum for uplink communications to a plurality of blocks of frequency spectrum for downlink communications, by associating uplink physical resource blocks (PRBs) of the control channel region to each downlink spectrum block, the control channel region comprising a first PRB and a second PRB, the first PRB of the control channel region being mapped to a first downlink spectrum block and the second PRB of the control channel region being mapped to a second downlink spectrum block.

26. The apparatus of claim 25, in which the processor is further configured to determine the mapping based on a received communication from a base station.

27. The apparatus of claim 26, in which the at least one processor is further configured to determine the mapping by associating uplink PRBs of at least one of a physical uplink shared channel (PUSCH), a physical random access channel (PRACH), and a sounding reference signal (SRS) to each downlink spectrum block.

28. The apparatus of claim 26, in which the downlink spectrum blocks have differing sizes.

29. The apparatus of claim 28, in which only a portion of each uplink spectrum block maps to a smaller sized downlink spectrum block.

30. The apparatus of claim 26, in which the processor is further configured to send a first sounding reference signal to a first base station and to send a second sounding reference signal orthogonal to the first sounding reference signal to a second base station.

31. An apparatus for wireless communication, comprising:
  means for mapping a control channel region of frequency spectrum for uplink communications to a plurality of blocks of frequency spectrum for downlink communications, by associating uplink physical resource blocks (PRBs) of the control channel region to each downlink spectrum block, the control channel region comprising a first PRB and a second PRB, the first PRB of the control channel region being mapped to a first downlink spectrum block and the second PRB of the control channel region being mapped to a second downlink spectrum block; and means for communicating in accordance with the mapping.

32. An apparatus for wireless communication, comprising:
means for determining a mapping of a control channel region of frequency spectrum for uplink communications to a plurality of blocks of frequency spectrum for downlink communications, by associating uplink physical resource blocks (PRBs) of the control channel region to each downlink spectrum block, the control channel region comprising a first PRB and a second PRB, the first PRB of the control channel region being mapped to a first downlink spectrum block and the second PRB of the control channel region being mapped to a second downlink spectrum block; and
means for communicating in accordance with the mapping.

33. A computer program product for wireless communication in a wireless network, comprising:
a non-transitory computer-readable medium having non-transitory program code recorded thereon, the program code comprising:
program code to map a control channel region of frequency spectrum for uplink communications to a plurality of blocks of frequency spectrum for downlink communications, by associating uplink physical resource blocks (PRBs) of the control channel region to each downlink spectrum block, the control channel region comprising a first PRB and a second PRB, the first PRB of the control channel region being mapped to a first downlink spectrum block and the second PRB of the control channel region being mapped to a second downlink spectrum block.

34. A computer program product for wireless communication in a wireless network, comprising:
a non-transitory computer-readable medium having non-transitory program code recorded thereon, the program code comprising:
program code to determine a mapping of a control channel region of frequency spectrum for uplink communications to a plurality of blocks of frequency spectrum for downlink communications, by associating uplink physical resource blocks (PRBs) of the control channel region to each downlink spectrum block, the control channel region comprising a first PRB and a second PRB, the first PRB of the control channel region being mapped to a first downlink spectrum block and the second PRB of the control channel region being mapped to a second downlink spectrum block.

* * * * *